United States Patent [19]

Eriksson

[11] Patent Number: 4,556,239
[45] Date of Patent: Dec. 3, 1985

[54] ARRANGEMENT AT A SHAFT SEAL

[75] Inventor: Bengt O. Eriksson, Sala, Sweden

[73] Assignee: Sala International Aktiebolag, Sala, Sweden

[21] Appl. No.: 536,944

[22] Filed: Sep. 27, 1983

[30] Foreign Application Priority Data

Oct. 4, 1982 [SE] Sweden .............................. 8205635

[51] Int. Cl.⁴ ..................... F16C 33/72; F16C 33/74; F04D 29/10
[52] U.S. Cl. .................... 384/130; 384/150; 415/170 A
[58] Field of Search ............... 308/187.1; 384/135, 384/142, 150, 130; 415/170 A, 171; 277/81 R, 82, 85, 91, 93 R, 236

[56] References Cited

U.S. PATENT DOCUMENTS

| | | | |
|---|---|---|---|
| 2,863,680 | 12/1958 | Taltavall, Jr. ....................... | 277/64 |
| 3,413,926 | 12/1968 | Ayson ............................... | 415/170 A |
| 3,511,185 | 5/1970 | Haentjens ......................... | 415/170 A X |
| 3,554,661 | 1/1971 | Oglesby et al. ................... | 415/170 A |
| 4,168,936 | 9/1979 | Scheller et al. .................. | 415/170 A |
| 4,380,416 | 4/1983 | Menager ........................... | 415/170 A |

FOREIGN PATENT DOCUMENTS 2034586 6/1979 Fed. Rep. of Germany .
16218 1/1901 Sweden .

Primary Examiner—Donald Watkins
Assistant Examiner—Thomas R. Hannon
Attorney, Agent, or Firm—Lee H. Kaiser; Timothy R. Conrad

[57] ABSTRACT

An arrangement at rotating shafts with a wheel fixedly mounted to the shaft, which wheel rotates in a housing surrounding the wheel, an essentially pipe-shaped element surrounding the shaft, an with essentially axially sealing surface provided sealing device between the pipe-shaped element and the wheel and a passage in the housing for the shaft with a sealing device, which seals against the pipe-shaped element. There is mounted a fastening device on the shaft for axial displacement of the pipe-shaped element in order to cause a sealing effect by means of the sealing device between the pipe-shaped element and the wheel. The fastening device is fixed in sealing position by a locking device.

7 Claims, 4 Drawing Figures

ARRANGEMENT AT A SHAFT SEAL

BACKGROUND OF THE INVENTION

The present invention relates to an arrangement at rotating shafts, which comprises a wheel fixedly mounted to the shaft, which wheel rotates in a housing surrounding the wheel, an essentially pipe-shaped element surrounding the shaft, and with essentially axially sealing surfaces provided sealing device between the pipe-shaped element and the wheel and a passage in the housing for the shaft with a sealing device, which seals against the pipe-shaped element.

Sealing arrangements of the kind described above are used on several various kinds of machines. An especially important field of use is fans and pumps of the centrifugal type.

The invention has been found to be especially valuable in those cases, when a pump impeller is mounted on a conical shaft end. This is because it has been found at the machining of the centre hole for the shaft end, that a very small difference in machining depth makes a great difference in the axial position of the pump impeller, when it is mounted. Previously known pumps of this type comprise a pipe-shaped element in the shape of a wear or shaft sleeve surrounding the pump shaft and a stuffing box mounted on the pump housing, which seals against the outside of the wear sleeve. In order not to get leakage between the wear sleeve and the shaft, there is also at this place required a sealing arrangement, which suitably is placed between the end surface of the wear sleeve and the pump impeller. This seal usually is a ring of resilient material placed in a slot between the sleeve and the pump impeller.

However, it has been found that in those cases when the distance between the end surface on the wear sleeve and the pump impeller varies within rather wide limits, so will such a resilient ring not always give satisfactory sealing effect. This is because a ring, which is so soft, that it is always compressed at mounting of the wheel, cannot give a perfect seal at high pressure differences if said slot is wide. If a sealing ring made of harder material is used, one cannot be sure, that the pump impeller has been mounted solidly abutting against the shaft end and not against the sealing ring. More narrow size tolerances for the pump impeller would on the other side cause great costs because of an increased number of cessations during machining. The use of sealing rings of different widths will certainly cause errors at the mounting because the right size of sealing ring is not used.

It is previously known to arrange a threaded portion on a pump shaft for tightening a nut or a threaded shaft sleeve. This embodiment has several disadvantages. Should any damage occur to the thread, this will cause substantial spare part costs, because the entire shaft must be replaced. When the threaded portion is repaired, for instance rethreading or loosening of a nut, which is stuck by rust, the entire pump must be dismantled and the shaft removed from the bearing housing. In both cases, there may also be great down-time costs because of lost production. The thread itself constitutes an indication of fracture, which may cause fatigue failure of the shaft. The thread itself is not protected and may easily be damaged during storage and transport. Such an arrangement with a threaded shaft cannot be installed in an existing pump without a great interference in the pump and exchange of the shaft.

OBJECTS AND SUMMARY OF THE INVENTION

The object of the present invention is to provide a seal between a wheel fixedly mounted on a shaft and an essentially pipe-shaped element surrounding the shaft. Especially the invention relates to an arrangement, which can give a perfect seal independently of how far in on the shaft the wheel is mounted.

Further object of the invention are to provide a fastening device, which is detachably mounted on the shaft, can be installed at an existing machine, is easy to install and dismantle as well as is cheap to produce and maintain.

In order to achieve this the invention is primarily characterized in, that a detachable fastening device is mounted on the shaft for axial displacement of the pipe-shaped element in order to cause a sealing effect by means of the sealing device between the pipe-shaped element and the wheel, the fastening device comprising an axially stationary part and an axially moveable part, whereat the axially stationary part is abutting against a shoulder on the shaft, directly or through an intermediate element or elements.

Fastening devices of the kind mentioned above may be made in various ways, for instance hydraulic piston devices, wedge devices or one or more spreader screws arranged at the outside of the shaft, which force the pipe-shaped element against the wheel. However, it has been found to be especially favourable to use a screwing device comprising an axially stationary and an axially moveable part, whereat the thread of the screwing device surrounds the shaft. This provides a cheap design, which is protected from damage from the outside and from dirt which may damage the threaded surface. The protruding part of the thread is suitably covered by a protection ring. In a preferred embodiment the axially stationary part is provided with an outside thread and is secured to the shaft with the aid of a locking screw.

In an alternative embodiment the stationary part has an inside thread and the moveable part is pipe-shaped and surrounds the shaft.

In a special embodiment, the screwing device comprises screw surfaces on the end surface of at least one of the parts with at least one entrance. In order to get more symmetric fastening forces, the screwing device should suitably comprise two or more symmetrically arranged entrances. At one of the parts it is possible, that the material in the part continues all the way out to the outer end of the thread on its outside or inside, in order to give increased strength. This embodiment may for instance be used in the case when the pipe-shaped element itself is provided with a screw surface, and thus at the same time comprises the moveable part of the screwing device. The pipe shaped element may, of course, also be provided with an outside or inside thread.

In order to fix the stationary part of the fastening device in an axial direction, it is suitably arranged to abut directly or through intermediate elements against a shoulder on the shaft.

In a specially advantageous embodiment the screwing device is replacing the slinger ring, which usually is arranged to protect the bearing device of the shaft on the side facing the wheel. By suitably chosen dimensions of the screwing device, one does not need to change the dimensions of the shaft and other parts, and may even exchange the slinger ring on already existing machines for a screwing device according to the invention.

In order to fix the fastening device in sealing position it should be provided with some kind of locking device. This locking device may for instance be screws, which are tightened against the shaft.

BRIEF DESCRIPTION OF THE DRAWINGS

The invention will be closer described below with the aid of drawing examples, where.

DESCRIPTION OF THE PREFERRED EMBODIMENT

Figure 1:
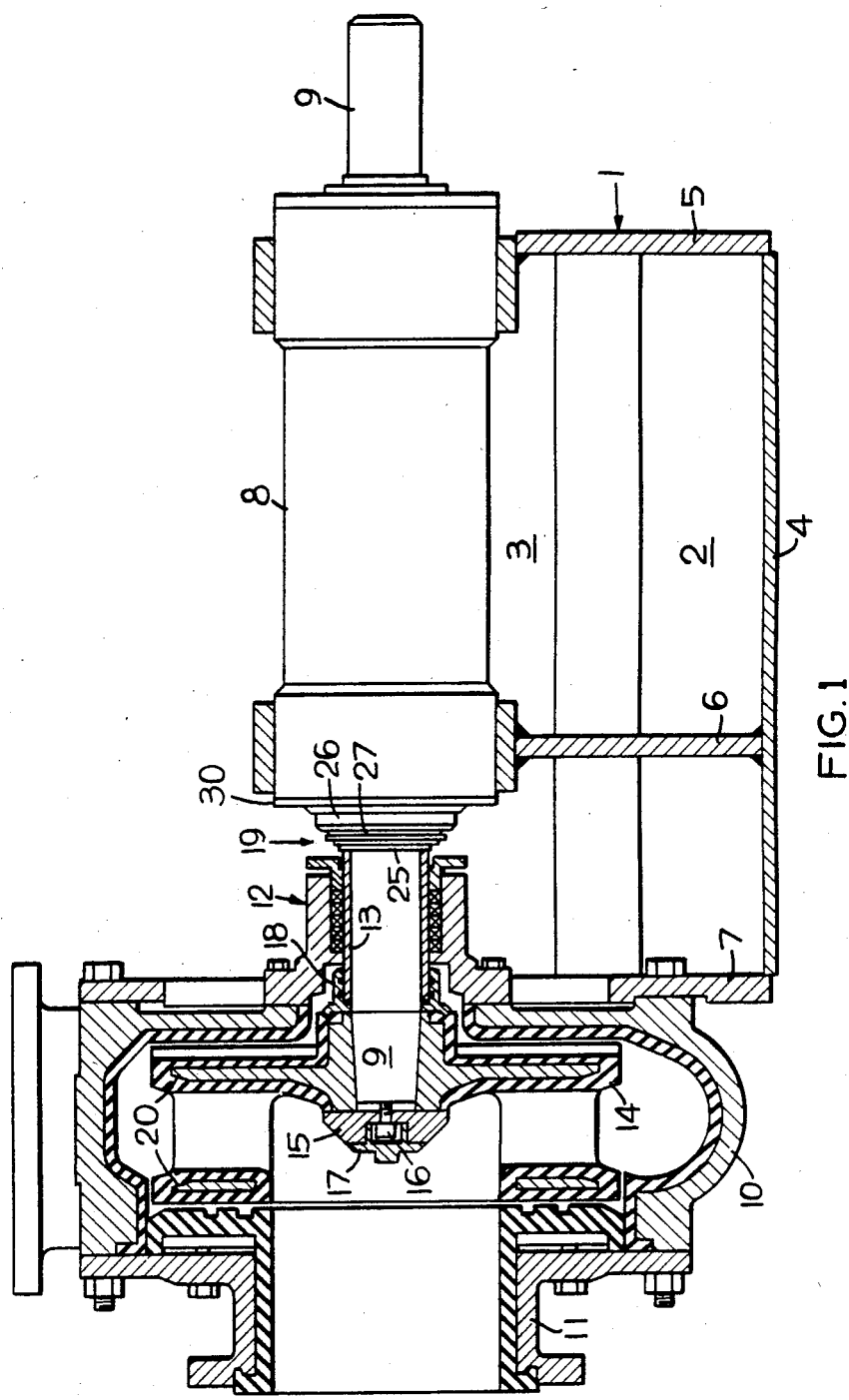
FIG. 1 shows a sectional view of a pump with an arrangement according to the invention.

FIG. 1 shows a pump with an arrangement according to the invention comprising a pump frame 1, longitudinal frame plates 2, 3, a base plate 4 and transversal frame plates 5, 6, 7, with seats for a bearing housing 8 with a pump shaft 9 and a pump housing 10 with an inlet portion 11. On the pump housing is mounted a shaft sealing housing 12 in the shape of a stuffing box, which seals against a pipe-shaped element or shaft sleeve 13 surrounding the shaft. The pump housing and adhering components and its wear lining are mounted with the aid of bolts. On the pump shaft 9 is mounted a pump impeller 14 on a conical shaft end with the aid of a retaining washer 15 and a bolt 16 covered by a cover 17. In order to achieve a seal between the pipe-shaped element 13 and the pump impeller 14 there is arranged a sealing washer 18, which is forced against the pump impeller 14 by a screwing device 19 situated on the other side of the pipe-shaped element.

Figure 2:
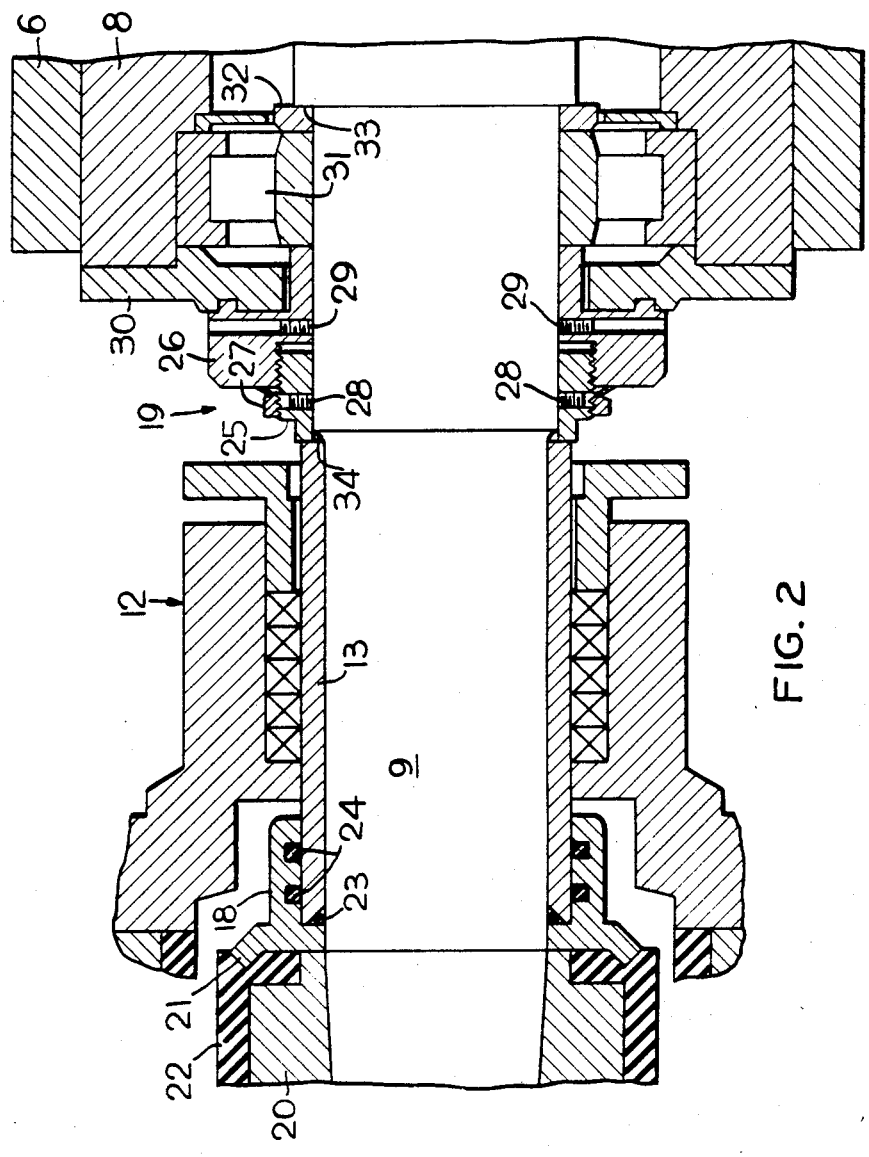
FIG. 2 shows a detail of FIG. 1 in a greater scale with a stationary inside thread.

The sealing washer and the screwing device are more evident from FIG. 2, which shows a detail of a pump shaft between the pump impeller and the end of the bearing housing 8 facing the pump wheel. Here it is evident, how the sealing washer 18 has a metallic contact with the iron frame 20 of the pump impeller 14, while a rib 21 is pressed into the wear rubber cover 22 of the pump impeller. In a bevel in the shaft sleeve 13, there is an O-ring 23 squeezed into the interspace towards the shaft 9 and the sealing washer 18. At the outside of the shaft sleeve there are another two O-rings 24 fitted in grooves in an extension of the sealing washer 18 surrounding the shaft sleeve. At the opposite side of the shaft sleeve there is a screwing device 19, which forces the shaft sleeve against the sealing washer 18, such that a seal is achieved against the pump impeller 14. The screwing device 19 comprises of an axially moveable screw ring 25 with outside thread, an axially stationary screw ring 26 with inside thread and a protection ring 27, which covers the protruding end of the thread. In order to prevent the screwing device from loosening, both the stationary and the moveable screw ring are provided with locking devices in the shape of one or more lock screws 28, 29. The screwing device 19 at the same time serves as a slinger ring in relation to a cover 30 for the bearing housing. The stationary screw ring 26 is through a bearing 31 and a spacer ring 32 abutting against a shoulder 33 on the shaft 9.

At the mounting of the pump impeller the moveable screw ring 25 is screwed to its innermost position in the stationary screw ring 26. The shaft sleeve 13 is pushed onto the shaft to an inner position abutting against a shoulder 34 and the sealing washer 18 with its O-rings are pushed after. The pump impeller 14 is now mounted, whereupon the sealing washer 18 is pressed against the pump impeller by screwing out the screw ring 25, such that the shaft sleeve 13 is pushed outwards. In order to make it possible to screw with enough torque, the screw rings are suitable provided with notches for so-called SKF-keys or shaped with attachments for other tools. Finally, the screw rings are fixed in position on the shaft by tightening the lock screws 28, 29 against the shaft 9.

Figure 3:
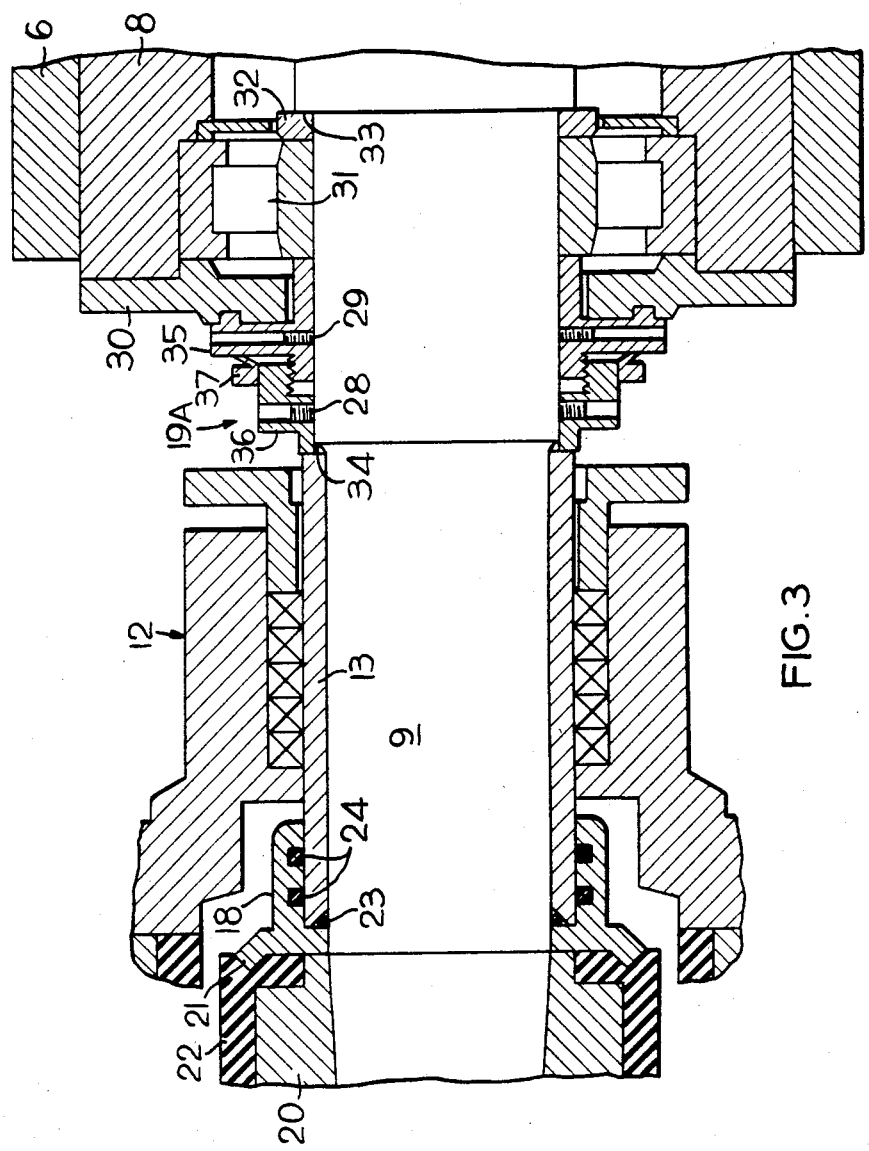
FIG. 3 shows a detail of FIG. 1 with an alternative embodiment comprising a stationary outside thread and FIG. 4 shows a detail of a shaft and a wear sleeve with a screw surface-shaped end.

FIG. 3 shows another embodiment of the invention with a screwing device 19A comprising an axially stationary screw ring 35 with outside thread and an axially moveable screw ring 36 inside thread and a protection ring 37. A device according to this embodiment offers the advantage, that the free thread surface is better protected against damage. In the figure corresponding details have been given the same designation as in FIG. 2.

Figure 4:
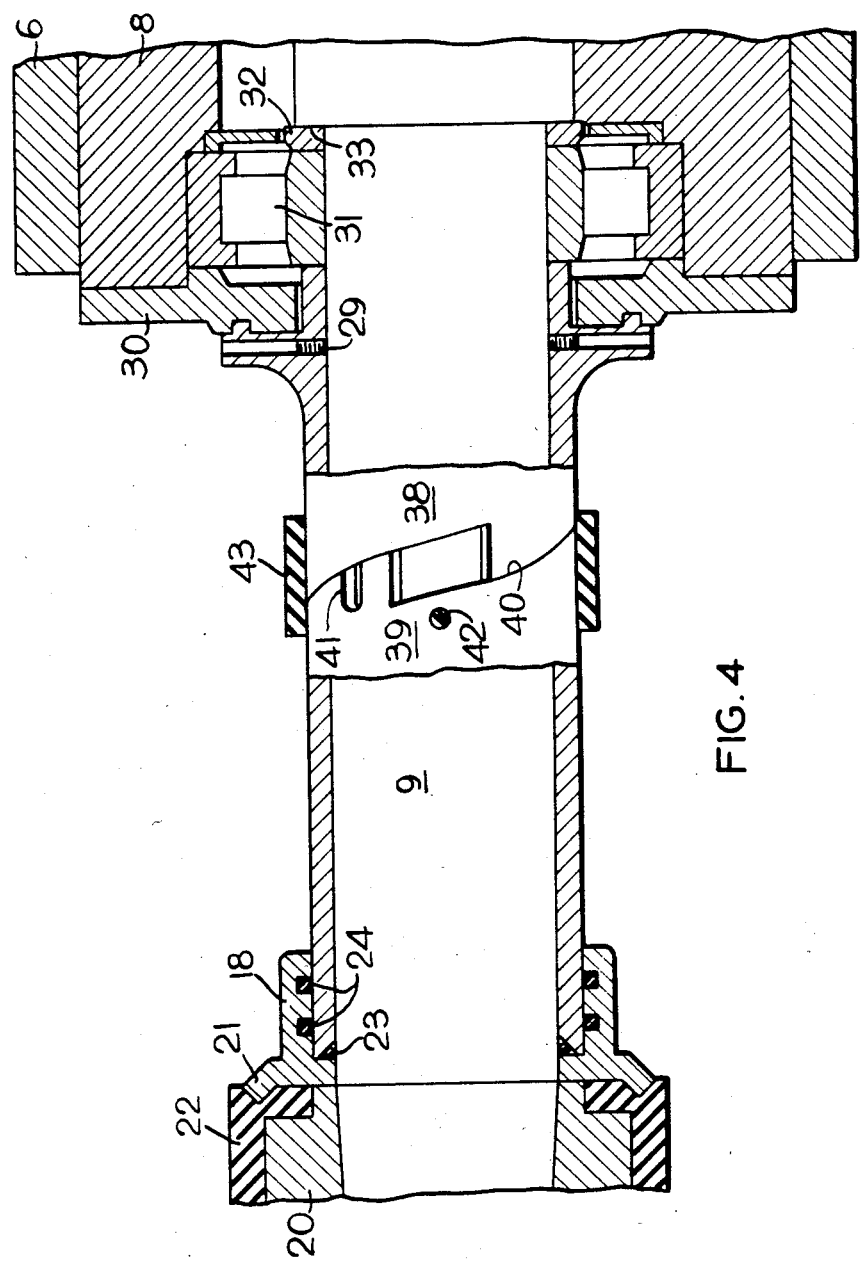

FIG. 4 shows a device according to the invention where the pipe shaped element is designed with a screw surface at its end surface. In the figure corresponding parts have been given the same designations as in the previous figures. The screwing device here comprises a modified slinger ring 38 with a screw surface-shaped end surface facing the pump impeller. The shaft sleeve 39 has a screw surface-shaped end surface 40, which is engaging the end surface of the slinger ring 38. For tightening of the shaft sleeve 39, such that the sealing washer 18 is pressed against the pump impeller, there is a notch 41 for a so-called SKF-key. The shaft sleeve is prevented from loosening by the lock screw 42. The thread surfaces are also covered by a protection ring 43.

The invention is not limited to the examples and embodiments described here, but may be varied within the limits of the following patent claims.

The embodiments of the invention in which an exclusive property or privilege is claimed are defined as follows:

1. A sealing arrangement for a rotary shaft comprising a wheel fixedly mounted to said shaft for rotation therewith; said shaft presenting a shoulder opposing said wheel; a pipe-shaped element surrounding said shaft intermediate said shoulder and wheel; a sealing element surrounding said shaft intermediate said wheel said and said pipe-shaped element; a selectively adjustable fastening device intermediate said pipe-shaped element and said shoulder; said selectively adjustable fastening device having a first member in force transmitting relation with said shoulder and a second member which is selectively axially movable with respect to said shaft and with said second member in force transmitting relation with said pipe-shaped element; said first and second members of said selectively adjustable fastening device are provided with opposing threaded surfaces with a threaded surface of said first member threadedly engaging a threaded surface of said second member whereby said second member may be axially moved away from said first member toward said wheel by means of turning said first or second member with said first member restrained from axial movement by means of said force transmitting relation between said first member and said shoulder.

2. A sealing arrangement for a rotary shaft according to claim 1 wherein said sealing element is provided with a cylindrical surface opposing an outer cylindrical surface of said pipe-shaped element; means for providing a seal between said opposing cylindrical surfaces.

3. A sealing arrangement for a rotary shaft according to claim 2 wherein said wheel comprises an impeller having an inner metal frame and a resilient outer cover; said sealing member comprises a sealing washer have a rib projecting toward said impeller and sized to be embedded within said resilient cover in sealing engagement as said sealing washer is urged against said impeller by said pipe-shaped member.

4. A sealing arrangement for a rotary shaft according to claim 1 wherein said threaded surface of said first member is radially inner surface facing said shaft and said threaded surface of said second member is a radially outer surface facing away from said shaft.

5. A sealing arrangement for a rotary shaft according to claim 1 wherein said threaded surface of said first member is a radially outer surface facing away from said shaft and said threaded surface of said second member is a radially inner surface facing said shaft.

6. A sealing arrangement for rotary shaft according to claim 1 comprising means for locking said first member in a selected position on said shaft and means for locking said second member in a selected position on said shaft.

7. A sealing arrangement for a rotary shaft according to claim 1 wherein said pipe-shaped element is provided with a threaded surface engaging a threaded surface of said first member and said piep-shaped member comprises said axially movable second member.

* * * * *